Figure 1:
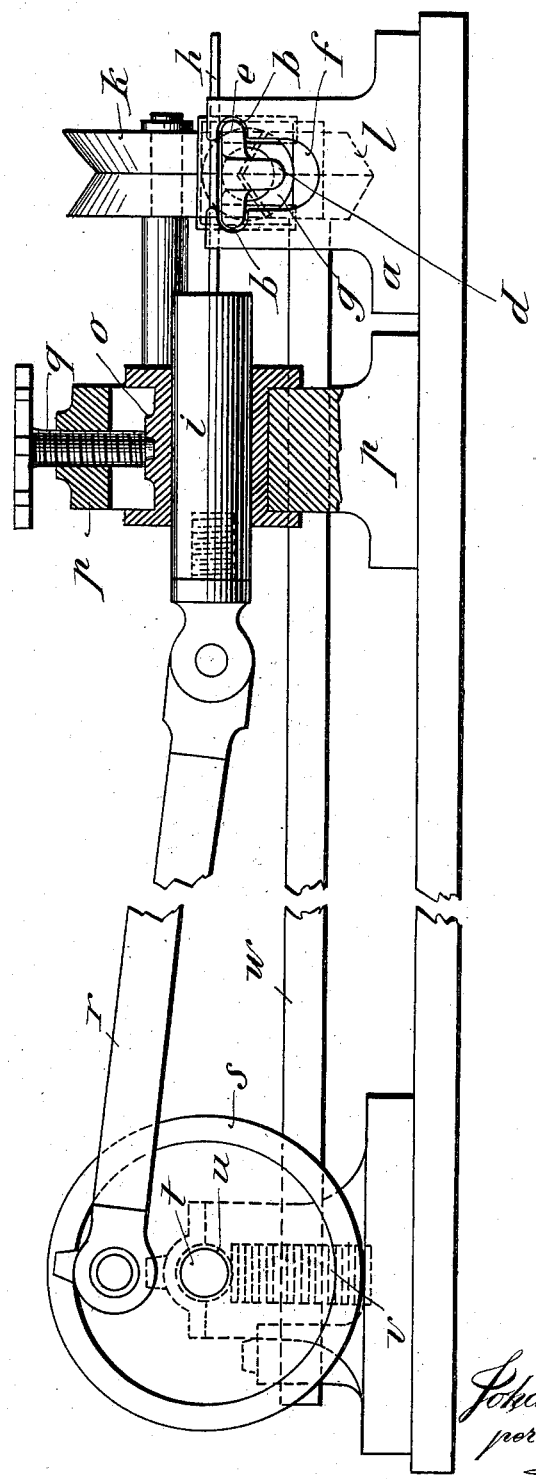

No. 731,536. PATENTED JUNE 23, 1903.
J. BOES.
MACHINE FOR REMOVING FAT FROM ENTRAILS.
APPLICATION FILED MAR. 24, 1902.
NO MODEL. 2 SHEETS—SHEET 1.

Witnesses: Inventor:
Johann Boes
per
Attorney

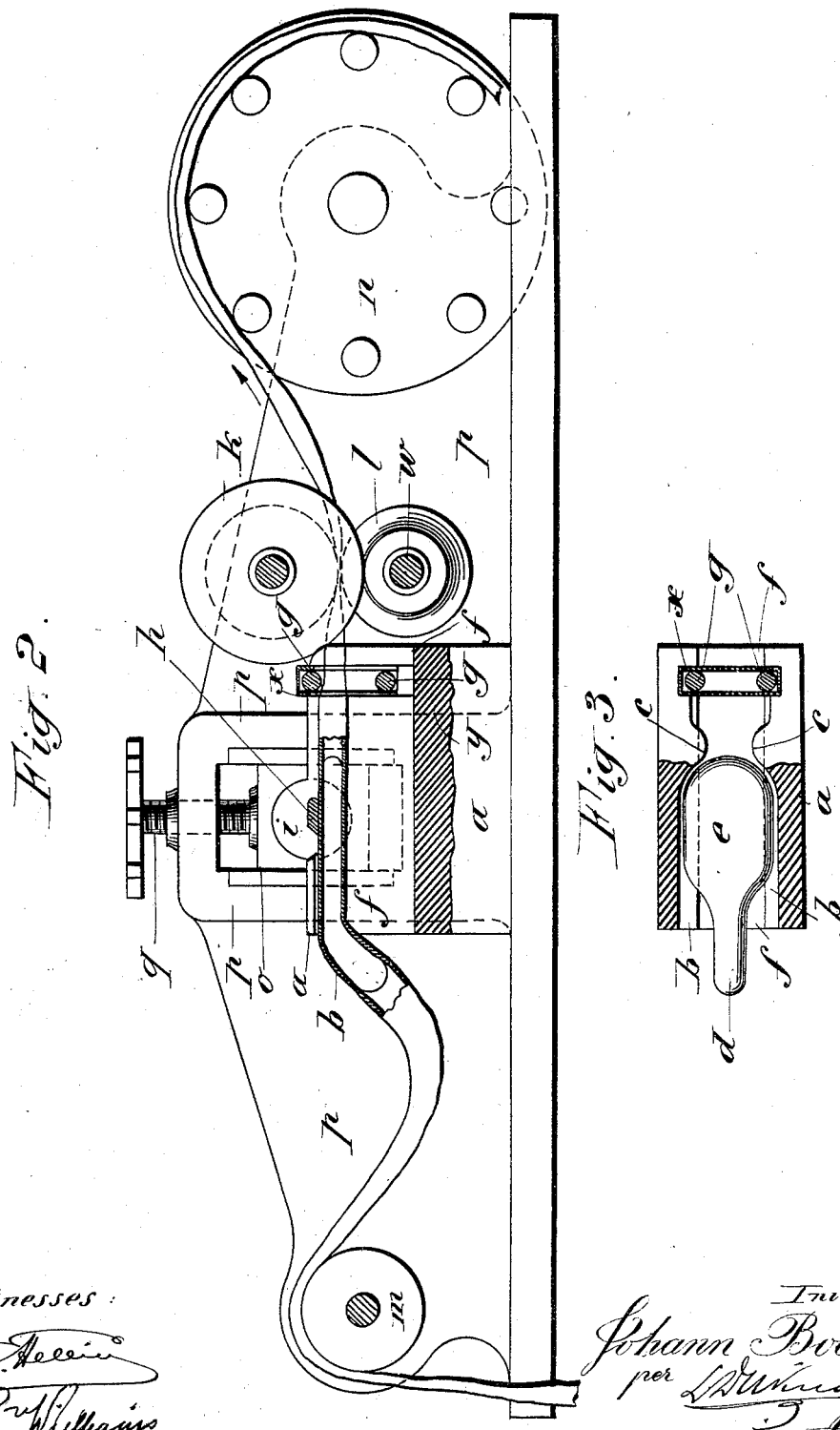

No. 731,536. Patented June 23, 1903.

UNITED STATES PATENT OFFICE.

JOHANN BOES, OF COLOGNE, GERMANY.

MACHINE FOR REMOVING FAT FROM ENTRAILS.

SPECIFICATION forming part of Letters Patent No. 731,536, dated June 23, 1903.

Original application filed June 25, 1901, Serial No. 65,984. Divided and this application filed March 24, 1902. Serial No. 99,702. (No model.)

*To all whom it may concern:*

Be it known that I, JOHANN BOES, a subject of the German Emperor, and a resident of Cologne, Province of Rhineland, Prussia, Germany, have invented certain new and useful Improvements in Machines for Removing Fat from Entrails, of which the following is a specification, this application being a division of my prior application, Serial No. 65,984, filed June 25, 1901.

The present invention relates to a machine for mechanically removing the fat from the guts of neat cattle and the like.

A form of construction for this machine is illustrated by the accompanying drawings.

Figure 1 is a front view, with a partial longitudinal section, of this machine. Fig. 2 is a cross-section of said machine. Fig. 3 is a section of part of said machine.

As is well known, the fat is only on one side of the guts—that is, it adheres to each gut only to the extent of half the circumference of the same. It is therefore sufficient to treat this half of the gut in such a way as to remove the fat from it. The present machine is accordingly adapted to this purpose.

The process is essentially as follows: The gut, guided in a suitable manner, is moved forward always in the same direction by two rotating rollers, between which it passes in such a way that its cross-section remains in the same position all the time, so that the layer of fat is always turned toward the same side. It is drawn lengthwise over a flat guiding-piece of a size to fit it and which is loosely held in a suitable seat in such a manner that the side which has the fat adhering to it lies spread out on the guiding-piece. At this point the fat is removed by a springy knife, which moves to and fro in the direction of its own length and at right angles to the gut, the rollers continually drawing the layer of fat on the gut against the edge of the knife. By the fact of the knife operating by being pressed against the gut in the manner of a spring, which is brought about by its being comparatively long and being only held fast at one end, and that at some distance from the gut, the knife gives way to the varying thickness of the gut and to the veins as they occur in the same and can thus remove the fat without damaging the gut.

In the example of construction for the machine illustrated in the drawings the seat for the guiding-piece is in the framework $a$, which seat consists of the lateral grooves $b$ and the projections or shoulders $c$ at their inner ends. The guiding-piece consists of a peg or plug shaped portion $d$, which is with advantage turned obliquely downward, and of a thinner, widened, and accordingly flat portion $a$. This guiding-piece lies with its flat portion $e$ in the grooves $b$ and rests when the gut is drawn over it in the direction of the arrow with its inner and correspondingly-rounded end against the projection $c$, but only loosely, so that it cannot pass on with the gut in the direction in which the latter is being drawn, but nevertheless in such a way as to permit the gut to pass on without hindrance between it and the projections.

The plug-shaped thick lower end $d$ of the guiding-piece, which passes gradually and in a curve into the flat part $e$, serves to spread out the gut that is first of all drawn onto $d$— that is, to widen it and gradually to bring it into the flat extended state in which it glides over the part $e$. That side of the gut to which the fat adheres lies spread out flat on the part $e$, so that the fat can here be removed by a flat knife. Naturally the space between the grooves on each side and the width of these grooves themselves must not only suffice to take the piece $e$, but there must also be sufficient room left around the latter to permit the thickest gut to pass through without difficulty. Underneath these grooves $b$ there is with advantage in the framework $a$, as shown in the drawings, a hollow, like a gutter, which goes lengthwise through $a$, and in which the gut moves and which serves as a receptacle for any fat that may drop down. Further, there is fixed in an upright in the framework $a$ at its hinder end—*i. e.*, at the end remote from the guiding-piece—a guiding-ring $g$ in such a way that its opening is turned toward the gut coming from $e$ between the projections $c$, which latter must of course be rounded off in a suitable way, so as not to cut or tear the gut. The gut is then drawn through the opening $g$, whereby after having been spread out and stretched on $e$ it is somewhat narrowed again and to some extent regains its roundness before passing between the rollers, which really draw it along.

The knife $h$, which removes the fat from the upper side of the gut, lies at the top of the framework $a$ at right angles to the same and in a corresponding hollow and reaches exactly to the top of the groove $b$, so that it lies with its flat side exactly on the upper side of the gut, which is spread out flat on $e$, while its edge is turned toward the direction from which the gut comes. The knife is held at its one end in a sliding piece $i$, which is moved to and fro horizontally on the framework $a$—i. e., away from and back again toward the latter by a suitable mechanical arrangement.

The drawing of the gut over the guiding-piece $e$ against the edge of the knife $h$ and through the ring $g$ is effected by two rollers $k$ and $l$, made from suitable material, which must not be so hard as to render it liable to damage the gut and which must also be of such a nature that in spite of the slipperiness of the fatty gut there will be sufficient friction between the latter and the rollers to draw the gut along. These rollers must also be able to give way sufficiently in the event of thick parts occurring in the gut. Hence the most suitable material for them is rubber. The form of rollers which has upon experiment proved most suitable is that shown in the drawings, in which the lower working roller $l$ engages with its conically widened or raised middle portion with the conically narrowed or hollowed-out middle portion of the other roller $k$, which is caused to rotate by friction. Of course $k$ might just as well be made the driving-roller and $l$ be rotated by friction, or both rollers might be driven direct.

If it be necessary, one of the two rollers (or even both of them) can in order to exactly adjust the space between them to the size and thickness of the gut or to accommodate the said space to the varying thicknesses of the gut to a greater extent than this is done by the mere employment of an elastic material (rubber and the like) be arranged so as to be adjustable, or one or both of them can be provided in addition with spring-bearings. The gut can be led up in the first place, as shown in the drawings, over a loose roller $m$ and can also after it has been drawn through the two rollers $k$ and $l$ be wound on a reel $n$.

In order to regulate the height of the knife—i. e., to adjust it to conform to the gut and to the guiding-piece $d\ e$—the box $o$, in which the sliding piece $i$, that holds the knife, moves to and fro, is fitted into a framework $p$, so that it is vertically adjustable. A screw $q$, which fits vertically into a corresponding female thread in the top or cover of the framework $p$, and which is provided at its upper end with a hand-wheel or the like to work it, serves to hold firm and to adjust the said box. As can be seen from Fig. 2 in the drawings, this framework $p$ can at the same time carry the bearing for the journals for the axles of the rollers $k$ and $l$, of the roller $m$, and of the reel $n$.

The movement of the sliding piece $i$ is effected by means of a rod $r$, which engages eccentrically with a fly-wheel $s$ on the axle $t$. This axle also carries an endless screw $u$, which through the medium of the screw-wheel $v$ rotates the shaft $w$, which lies at right angles to $p$ and which carries at one end the roller $l$ and forms the axle of the same.

The shaft $t$, which accordingly actuates the whole machinery, can of course be rotated by hand by means of cranks or by a treadle or by any kind of engine or machinery through the medium of endless bands, chains, toothed gearing, and the like.

In order that the height of the porcelain ring $g$ may be regulated, the said ring can, as shown in the drawings, be firmly wedged in a rectangular frame $x$, U-shaped in cross-section and made of tin or the like, while the frame itself is guided by vertical grooves in the framework $a$ on either side of the hollow or gutter $f$, so that it can be moved up and down and be fixed either by wedging or by any other suitable means—e. g., by a set-screw or the like. The guiding-piece $d\ e$ is of course made from some suitable material—e. g., wood, horn, or the like.

Having fully described my invention, what I claim, and desire to secure by Letters Patent, is—

In a machine for removing fat from entrails the combination of, a reel for winding the guts upon, a guide-piece formed of the plug-shaped portion $d$ and a wide flat portion $e$, a seating for said guide-piece, a shoulder over which the gut passes, a knife placed at right angles to the gut, an adjustable sliding piece wherein said knife is held, two conical rollers whereby the gut is drawn over the guiding-piece, a gutter or hollow $f$ made in the framework and an adjustable guide-ring.

In testimony whereof I have hereunto set my hand in presence of two witnesses.

JOHANN BOES.

Witnesses:
 CARL SCHMITT,
 GOH SCHOLEZ.